US012689929B2

(12) United States Patent
Bashir et al.

(10) Patent No.: US 12,689,929 B2
(45) Date of Patent: Jul. 21, 2026

(54) SLICE PRIORITY FOR MULTI-TENANT ARCHITECTURE

(71) Applicant: Boost SubscriberCo L.L.C., Englewood, CO (US)

(72) Inventors: Kazi N. Bashir, Lewisville, TX (US); Rajesh Chilka, Littleton, CO (US); Mehdi Alasti, Arlington, VA (US); Siddhartha Chenumolu, Ashburn, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 287 days.

(21) Appl. No.: 18/634,711

(22) Filed: Apr. 12, 2024

(65) Prior Publication Data

US 2025/0324305 A1     Oct. 16, 2025

(51) Int. Cl.
*H04W 24/10* (2009.01)
(52) U.S. Cl.
CPC ................................... *H04W 24/10* (2013.01)
(58) Field of Classification Search
CPC ..... H04L 41/40; H04L 41/5022; H04L 45/64; H04L 45/80; H04W 24/02; H04W 24/10
See application file for complete search history.

(56) References Cited

U.S. PATENT DOCUMENTS

| | | | | |
|---|---|---|---|---|
| 12,314,265 | B1 * | 5/2025 | Liu ........................ | G06F 16/248 |
| 2006/0209768 | A1 * | 9/2006 | Yan ........................ | H04W 76/12 |
| | | | | 370/338 |
| 2010/0002668 | A1 * | 1/2010 | Tan ..................... | H04L 61/5084 |
| | | | | 370/338 |
| 2016/0246626 | A1 * | 8/2016 | Kolesnik ............. | G06F 9/45558 |
| 2020/0007453 | A1 * | 1/2020 | Maniyar ................. | H04L 49/90 |
| 2020/0389410 | A1 * | 12/2020 | Guim Bernat .......... | H04L 67/10 |
| 2024/0049046 | A1 * | 2/2024 | Kodaypak ......... | H04W 28/0278 |

* cited by examiner

*Primary Examiner* — Robert J Lopata
(74) *Attorney, Agent, or Firm* — Kilpatrick Townsend & Stockton LLP

(57) ABSTRACT

An apparatus comprises a memory and a processor communicatively coupled to one another. The memory may be operable to store multiple tenant profiles. Each tenant profile of the tenant profiles is associated with one or more entitlements for at least one service. The processor may be configured to receive a request to access at least one of the one or more entitlements for a service. The request indicates slice priority information comprising a priority level indicating an importance of a communication associated with the request. Further, the processor may be configured to obtain a tenant identifier (ID) and a slice priority ID from the slice priority information, determine multiple network access commands based on the tenant profile, and generate a report comprising the network access commands.

20 Claims, 3 Drawing Sheets

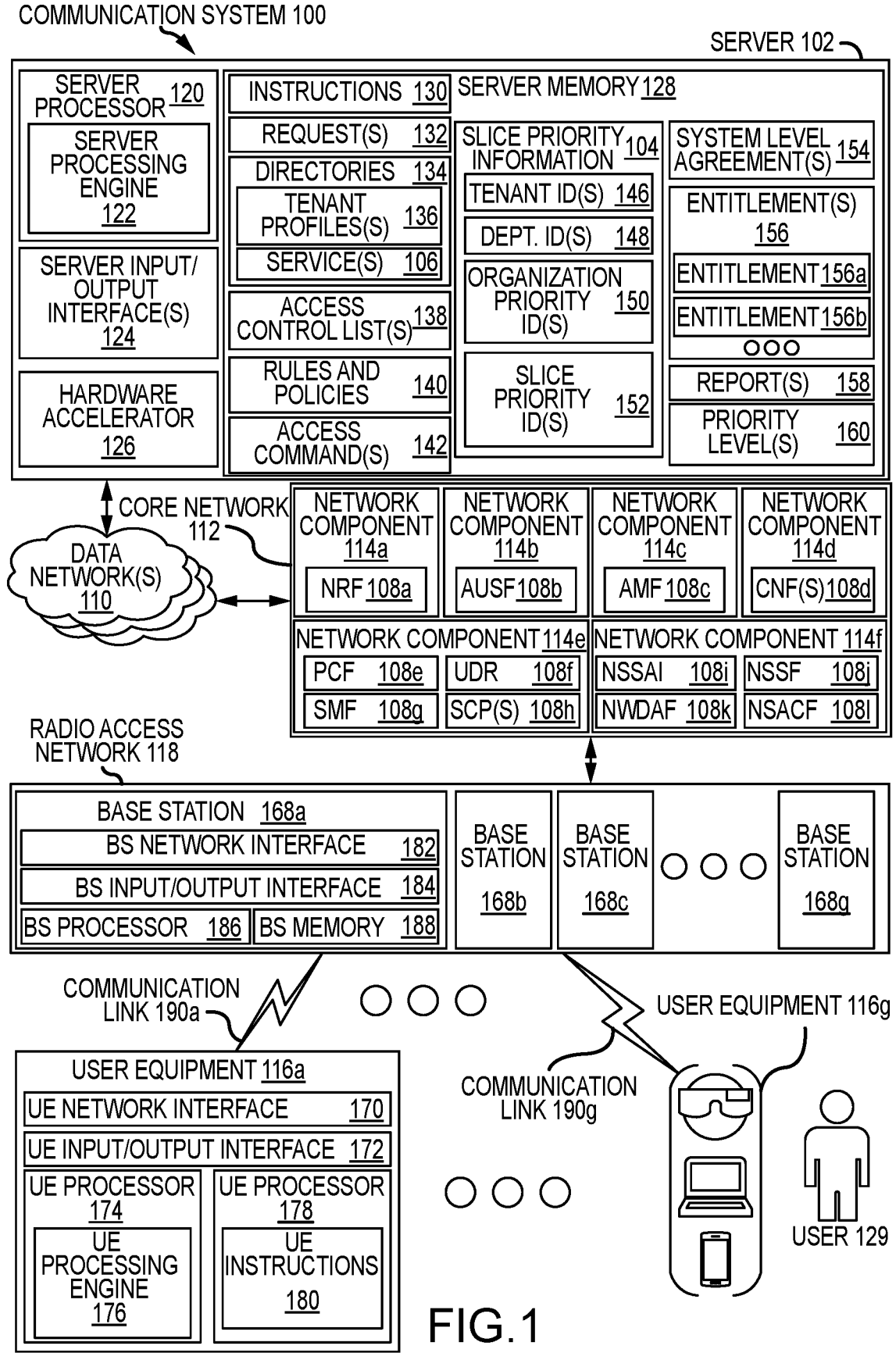

COMMUNICATION SYSTEM 100

SERVER 102

SERVER 102

SERVER PROCESSOR 120
- SERVER PROCESSING ENGINE 122
- SERVER INPUT/OUTPUT INTERFACE(S) 124
- HARDWARE ACCELERATOR 126

SERVER MEMORY 128

INSTRUCTIONS 130
- REQUEST(S) 132
- DIRECTORIES 134
  - TENANT PROFILES(S) 136
  - SERVICE(S) 106
- ACCESS CONTROL LIST(S) 138
- RULES AND POLICIES 140
- ACCESS COMMAND(S) 142

SLICE PRIORITY INFORMATION 104
- TENANT ID(S) 146
- DEPT. ID(S) 148
- ORGANIZATION PRIORITY ID(S) 150
- SLICE PRIORITY ID(S) 152

SYSTEM LEVEL AGREEMENT(S) 154
- ENTITLEMENT(S) 156
  - ENTITLEMENT 156a
  - ENTITLEMENT 156b
  - ooo
- REPORT(S) 158
- PRIORITY LEVEL(S) 160

CORE NETWORK 112

DATA NETWORK(S) 110

NETWORK COMPONENT 114a
- NRF 108a

NETWORK COMPONENT 114b
- AUSF 108b

NETWORK COMPONENT 114c
- AMF 108c

NETWORK COMPONENT 114d
- CNF(S) 108d

NETWORK COMPONENT 114e
- PCF 108e
- SMF 108g
- UDR 108f
- SCP(S) 108h

NETWORK COMPONENT 114f
- NSSAI 108i
- NWDAF 108k
- NSSF 108j
- NSACF 108l

RADIO ACCESS NETWORK 118

BASE STATION 168a
- BS NETWORK INTERFACE 182
- BS INPUT/OUTPUT INTERFACE 184
- BS PROCESSOR 186  BS MEMORY 188

BASE STATION 168b

BASE STATION 168c ooo

BASE STATION 168g

COMMUNICATION LINK 190a

COMMUNICATION LINK 190g

USER EQUIPMENT 116g ooo

USER EQUIPMENT 116a
- UE NETWORK INTERFACE 170
- UE INPUT/OUTPUT INTERFACE 172
- UE PROCESSOR 174
  - UE PROCESSING ENGINE 176
- UE PROCESSOR 178
  - UE INSTRUCTIONS 180 ooo

USER 129

FIG.1

PROCESS 300

SLICE PRIORITY FOR MULTI-TENANT ARCHITECTURE

TECHNICAL FIELD

The present disclosure relates generally to access network slices in a communication system, and more specifically to slice priority for multi-tenant architecture.

BACKGROUND

In some wireless communications systems, user devices associated with one or more tenants spend several device resources selecting application programming interfaces (APIs) to access a specific service. These device resources may be power resources, memory resources, and processing resources that a given user device consumes while a user attempts to access the specific service from the given user device. The device resources are wasted when the given user device lacks a structure to directly access network slices for the specific service in a core network. For example, device resources may be wasted by attempting to enter a search query in a browser and scrolling through services to identify network slices available to be accessed by the user device.

SUMMARY OF THE DISCLOSURE

In one or more embodiments, one or more systems disclosed herein provide network slice priority for multi-tenant architecture. In particular, the systems may be configured to provide access to network slicing resources in accordance with a corresponding priority level. Each tenant profile may comprise one or more departments. In accordance with rules and policies associated with a given tenant, the departments associated with the given tenant profile may have access to one or more of the services. Herein, the system and method comprise a slice priority for multi-tenant architecture in which network slices for one or more services may be directly referenced, accessed, or modified in accordance with a priority level comprising a tenant tier and/or a department tier. In some embodiments, the network slice priority multi-tenant architecture indicates the tenant tier and/or the department tier along a corresponding priority level to access application programming interfaces (APIs) in one or more network slices in the network. The priority level may be included in slice priority information exchanged along one or more requests to access network resources in a network.

In the slice priority multi-tenant architecture, a tenant is assigned one tenant identifier (ID) or multiple tenant IDs. The tenant ID may be string of characters comprising symbols, letters, and/or numbers. The tenant ID may comprise human-readable words that indicate a name of a given tenant (e.g., "Tenant1," "Tenant2," and the like). A given tenant may comprise multiple departments. Each department may be assigned a department ID (e.g., "Department1," "Department2," and the like). Multiple services may be assigned to each department of a tenant. These services may be provided to the tenants and/or departments in the form of network slices. A group of tenants or a group of departments of a tenant may share one or multiple services. For instance, a first tenant ID for a first tenant may be "Tenant1" and a second tenant ID for a second tenant may be "Tenant2." For services that may be shared between Tenant1 and Tenant2, a shared tenant ID may be "Tenant1_Tenant2". In some embodiments, for services that may be shared across Department1 and Department2 of a Tenant1, a shared tenant ID may be "Tenant1.Department1_Department2." In this regard, access control lists, rules and policies, and system level agreements may be shared across tenants or departments. The tenants and/or corresponding departments may share APIs will be the same for both tenants and/or departments. In some embodiments, a set of APIs may be mapped to a specific tenant. In one or more embodiments, the tenant ID and the department ID may be included and/or referenced in the slice priority information to indicate corresponding tenant tiers and/or department tiers.

In one or more embodiments, the system and method described herein are integrated into a practical application of prioritizing multi-tenant access to services. In this regard, the system and method are configured to map an access to services along with entitlements associated with those services in the slice priority information. In this regard, the systems provide the practical application of enabling direct access to network resources in network slices in accordance with a corresponding priority level. For example, two tenants attempting to reach network resources may be queued in accordance with corresponding priority levels in the slice priority information.

In addition, the system and method described herein are integrated into a technical advantage of increasing processing speeds in a computer system, because processors associated with the system and method prevent or eliminate waste of resources caused by searching and referencing individual entitlements associated with a request for a given service. Instead, the multi-tenant slice priority enables the use of the slice priority information to reference a specific slice priority along with any entitlements available for the specific service in a single information element. In some embodiments, the slice priority information including the tenant IDs and the department IDs may be included along a unique slice ID.

In one or more embodiments, the system and method may be performed by an apparatus, such as a server, communicatively coupled to multiple network components in a core network, one or more base stations in a radio access network, and one or more user equipment. Further, the system may be a wireless communication system, that comprises the apparatus. In addition, the system and method may be performed as part of a process performed by the apparatus communicatively coupled to the network components in the core network. As a non-limiting example, the apparatus may comprise a memory and a processor communicatively coupled to one another. The memory may be operable to store multiple tenant profiles. Each tenant profile of the tenant profiles is associated with one or more entitlements for at least one service. The processor may be configured to receive a request to access at least one of the one or more entitlements for a service. The request indicates slice priority information comprising a priority level indicating an importance of a communication associated with the request. Further, the processor may be configured to obtain a tenant identifier (ID) and a slice priority ID from the slice priority information. The tenant ID indicating a tenant profile configured to access an entitlement via the service and the slice priority ID indicating the priority level. The processor is configured to determine multiple network access commands based at least in part upon the tenant profile. The network access commands may be configured to enable access to the entitlement via the service. The processor is configured to generate a report comprising the network access commands.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 illustrates an example communication system, in accordance with one or more embodiments;

DETAILED DESCRIPTION

In one or more embodiments, a system is configured to enable slice priority access to network resources for multi-tenant architecture. In this regard, the system is configured to use network slicing to support hierarchical multi-tenant operations. The system maps network slices comprising network resources to one or more departments associated with a given tenant profile in a communication system. One or more services in the communication system may be accessed via an application function identifier (ID) that indicates one or more application programming interfaces (APIs) corresponding to a department within a given tenant. In one or more embodiments, the system is configured to implement namespaces in hierarchical multi-tenant container-erized service clusters. In this regard, the system and method separate network functions into namespaces within Kubernetes clusters. A given network function and/or network slices may be accessed by referencing a corresponding namespace.

Figure 2:
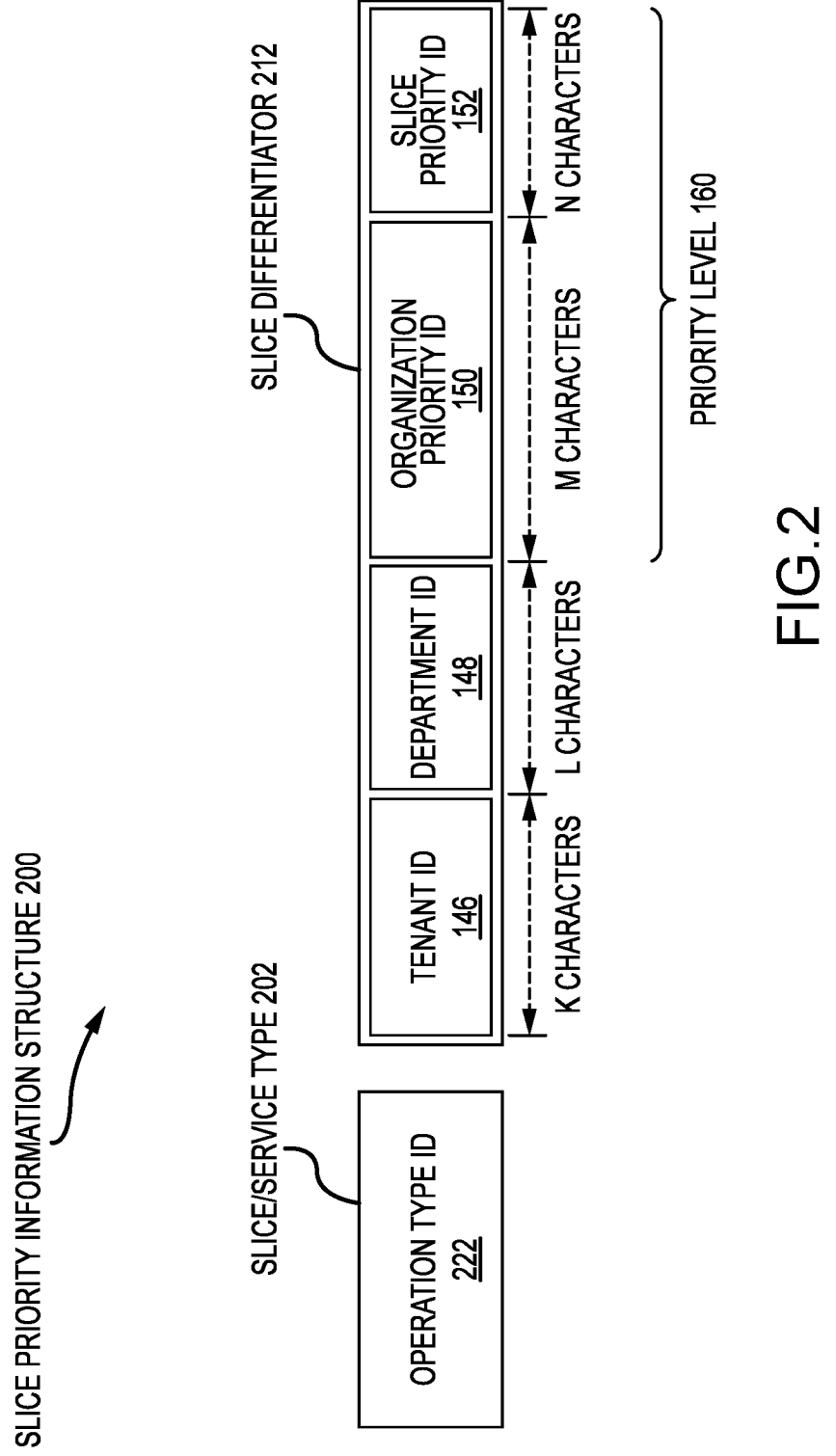
FIG. 2 illustrates an example of slice priority information exchanged in the communication system of FIG. 1, in accordance with one or more embodiments.
Figure 3:
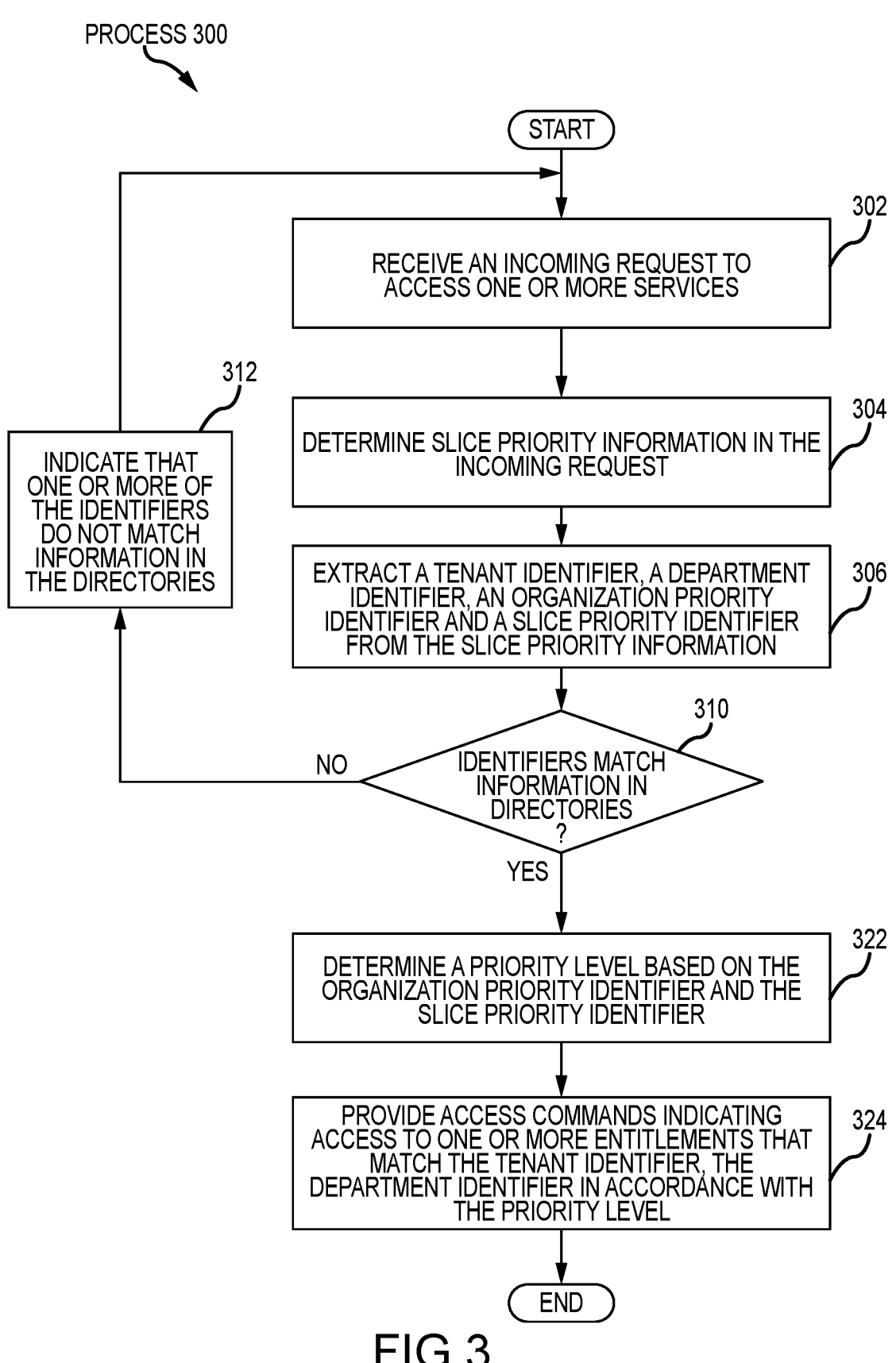
FIG. 3 illustrates an example flowchart of a method to provide access to service in accordance with slice priority, in accordance with one or more embodiments.

In one or more embodiments, FIG. 1 illustrates a communication system 100 in which a server 102 uses slice priority information 104 to access specific services 106 and/or network functions (NFs) 108a-1081 (collectively, NFs 108). FIG. 2 illustrates a slice priority information structure 200. The slice priority information structure 200 is implemented by the communication system 100 of FIG. 1. FIG. 3 illustrates a process 300 to access slices of services 106 performed by the communication system 100 of FIG. 1.
Communication System Overview FIG. 1 illustrates a diagram of a communication system 100 (e.g., a wired and/or wireless communication system) comprises a server 102 configured to use slice priority information 104 to access one or more services 106 and/or one or more network functions (NFs) 108a-1081 (collectively, NFs 108), in accordance with one or more embodiments. The services 106 and the NFs 108 may be located in one or more data networks 110 and/or one or more core networks 112. Herein, the services 106 comprise applications, access to resources, and/or allowance to perform modifications. In FIG. 1, the server 102 is communicatively coupled to multiple devices in the communication system 100. While FIG. 1 shows the server 102 connected directly to the one or more data networks 110, the server 102 may be located inside the core network 112 as part of one or more network components 114a-114f (collectively, network components 114) in the core network 112.

In one or more embodiments, the communication system 100 comprises the user equipment 116a-116g (collectively, user equipment 116), a radio access network (RAN) 118, the core network 112, the one or more data networks 110, and the server 102. In some embodiments, the communication system 100 may comprise a Fifth Generation (5G) mobile network, a Sixth Generation (6G), or wireless communication system, utilizing high frequency bands (e.g., 24 Gigahertz (GHz), 39 GHz, and the like) or lower frequency bands such (e.g., frequency range FR1 Sub 6 GHz-less than 7.125 GHZ). In this regard, the communication system 100 may comprise a large number of antennas. In some embodiments, the communication system may perform one or more communication operations associated with 5G New Radio (NR) protocols described in reference to the Third Generation Partnership Project (3GPP). As part of the 5G NR protocols, the communication system 100 may perform one or more millimeter (mm) wave or sub-Terahertz technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or Sixth Generation (6G) mobile networks.
Service-Based Architecture The communication system 100 may comprise a service-based architecture (SBA). The SBA may be an organization scheme in the core network 112 that comprises authentication, security, session management, and aggregation of traffic from end devices (e.g., the user equipment 116). In the SBA, the core network 112 may be representative of the 5G Core network and comprises multiple network components 114. In the SBA, the network components 114 are hardware (e.g., electronic circuitry with communication ports, a processor, and a memory) configured to perform one or more specific NFs 108. Herein, network components 114a-114f configured to perform one or more NFs 108 maybe referenced using an NF-associated name. For example, a network component 114a configured to perform a network repository function (NRF) 108a may be referred to as an NRF (or an NRF network component). In another example, one of the network components 114a-114f may comprise a version of the server 102 with a server processor 120 configured to perform one or more specific NFs 108.

In some embodiments, individual network components 114 provide services or resources to other network components 114 performing different NFs 108. In other embodiments, each NF is a service provider that allocates one or more resources in communications inside or outside the network components 114 to provide one or more services. The services may be specific for each of the network components 114 and their respective NFs 108 instead of each of the network components 114 providing and consuming processing resources and memory resources to perform multiple NFs 108 in the core network 112. In 5G NR mobile networks, the SBA is defined by 3GPP to comprise one or more network components 114 configured to perform specific NFs 108 to provide control plane operations and user plane operations. In the 5G NR, the control plane comprises any part of the communication system 100 that controls operations and routing associated with data packets and forwarding operations. Further, in the 5G NR, the user plane comprises any part of the communication system 100 that carries user traffic operations.

In one or more embodiments, the SBA may be configured to provide network slices in accordance with specific application scenarios. A network slice may be one or more portions of a collection of NFs 108 that are combined into providing specific application resources and/or network resources. In some embodiments, access to the application resources and/or the network resources may be provided to one or more user equipment 116 simultaneously via web-based Application Programming Interfaces (APIs). The APIs may enable flexible and agile deployment of innovative services. An API may be a set of instructions that, when executed by a processor, perform modular or cloud-native functions and procedures allowing creation of applications (e.g., the services 106) that access features or data of an operating system, application, or other service in the communication system 100.

Communication System Components

Server

In one or more embodiments, the system and method may be performed by an apparatus, such as a server, communicatively coupled to multiple network components in a core network, one or more base stations in a radio access network, and one or more user equipment. The server 102 is generally any device that is configured to process data, communicate with the data networks 110, one or more network components 114 in the core network 112, the RAN 118, and the user equipment 116. The server 102 may be configured to monitor, track data, control routing of signal, and control operations of certain electronic components in the communication system 100, associated databases, associated systems, and the like, via one or more interfaces. The server 102 is generally configured to oversee operations of the server processing engine 122. The operations of the server processing engine 122 are described further below. In some embodiments, the server 102 comprises the server processor 120, one or more server Input (I)/Output (O) interfaces 124, a hardware accelerator 126, and a server memory 128 communicatively coupled to one another. The server 102 may be configured as shown, or in any other configuration. As described above, the server 102 may be located in one of the network components 114 located in the core network 112 and may be configured to perform one or more NFs 108 associated with communication operations of the core network 112. The server 102 may be configured to request access to one or more application functions (AFs) dedicated to specific functionality provided by a given network slice.

In one or more embodiments, the server processor 120, the server I/O interfaces 124, the hardware accelerator 126, and the server memory 128 may be located at a same location or distributed over multiple remote locations separate from one another.

The server processor 120 may comprise one or more processors operably coupled to and in signal communication with the server I/O interfaces 124, the hardware accelerator 126, and the server memory 128. The server processor 120 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 120 may be a programmable logic device, a microcontroller, a microprocessor, or any suitable combination of the preceding. The one or more processors in the server processor 120 are configured to process data and may be implemented in hardware or software executed by hardware. For example, the server processor 120 may be an 8-bit, a 16-bit, a 32-bit, a 64-bit, or any other suitable architecture. The server processor 120 may comprise an arithmetic logic unit (ALU) to perform arithmetic and logic operations, processor registers that supply operands to the ALU, and store the results of ALU operations, and a control unit that fetches software instructions such as server instructions 130 from the server memory 128 and executes the server instructions 130 by directing the coordinated operations of the ALU, registers and other components via the server processing engine 122. The server processor 120 may be configured to execute various instructions. For example, the server processor 120 may be configured to execute the server instructions 130 to perform functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

In the example of FIG. 1, the server I/O interfaces 124 may comprise one or more displays configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays may be configured to present visual information to one or more users 129. The one or more displays may be configured to present visual information to the one or more users 129 updated in real-time. The one or more displays may be a wearable optical display (e.g., glasses or a head-mounted display (HMD)) configured to reflect projected images and enable user to see through the one or more displays. For example, the one or more displays may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays are a graphical display on the server 102. For example, the graphical display may be a tablet display, or a smartphone display configured to display the data representations.

In one or more embodiments, the server I/O interfaces 124 may be hardware configured to perform one or more communication operations. The server I/O interfaces 124 may comprise one or more antennas as part of a transceiver, a receiver, or a transmitter for communicating using one or more wireless communication protocols or technologies. In some embodiments, the server I/O interfaces 124 may be configured to communicate using, for example, NR or LTE using at least some shared radio components. In other embodiments, the server I/O interfaces 124 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications.

The server I/O interfaces 124 may comprise one or more server network interfaces that may be any suitable hardware or software (e.g., executed by hardware) to facilitate any suitable type of communication in wireless or wired connections. These connections may comprise, but not be limited to, all or a portion of network connections coupled to additional network components 114 in the core network 112, the RAN 118, the user equipment 116, the Internet, an Intranet, a private network, a public network, a peer-to-peer network, the public switched telephone network, a cellular network, a local area network (LAN), a metropolitan area network (MAN), a wide area network (WAN), and a satellite network. The server network interface 124 may be configured to support any suitable type of communication protocol.

The server I/O interfaces 124 may comprise one or more administrator interfaces that may be user interfaces configured to provide access and control to of the server 102 to one or more users 129 via the user equipment 116 or electronic devices. The one or more users 129 may access the server memory 128 upon confirming one or more access credentials to demonstrate that access or control to the server 102 may be modified. In some embodiments, the one or more administrator interfaces may be configured to provide hardware and software resources to the one or more users 129. Examples of user devices comprise, but are not limited to, a laptop, a computer, a smartphone, a tablet, a smart device, an Internet-of-Things (IoT) device, a simulated reality device, an augmented reality device, or any other suitable type of device. The administrator interfaces may enable access to one or more graphical user interfaces (GUIs) via an image generator display (e.g., the one or more displays), a touchscreen, a touchpad, multiple keys, multiple buttons, a mouse, or any other suitable type of hardware that allow users 129 to view data or to provide inputs into the server 102. The server 102 may be configured to allow users 129 to send requests to one or more network components 114 or network.

In some embodiments, the hardware accelerator 126 may be any combination of a baseband processor, analog RF signal processing circuitry (e.g., including filters, mixers, oscillators, amplifiers, and the like), or digital processing circuitry (e.g., for digital modulation as well as other digital processing). For example, the hardware accelerator 126 may be configured to allocate power, frequency, and sensing resources during wireless communication operations.

The server memory 128 may be volatile or non-volatile and may comprise a read-only memory (ROM), random-access memory (RAM), ternary content-addressable memory (TCAM), dynamic random-access memory (DRAM), and static random-access memory (SRAM). The server memory 128 may be implemented using one or more disks, tape drives, solid-state drives, and/or the like. The server memory 128 is operable to store the server instructions 130, one or more requests 132, one or more directories 134 comprising access to a plurality of tenant profiles 136 associated with the one or more services 106 and the one or more of the NFs 108, an access control list 138, one or more rules and policies 140, one or more access commands 142, slice priority information 104 comprising one or more tenant IDs 146, one or more department IDs 148, one or more organization priority IDs 150, and one or more slice priority IDs 152, one or more system level agreements 154, one or more entitlements 156 (shown comprising entitlements 156a and entitlements 156b among others), one or more reports 158, and one or more priority levels 160. The priority levels 160 may relate one or more name-space IDs (not shown) in one or more containerized services (not shown) and one or more slice group IDs (not shown) to one or more namespaces or one or more network slices in the communication system 100. In the server memory 128, the server instructions 130 may comprise commands and controls for operating one or more specific NFs 108 in the core network 112 when executed by the server processing engine 122 of the server processor 120.

Herein, the multiple references to containerized clusters are non-limiting examples of container orchestration platforms configured to schedule and automate deployment, management, and scaling of containerized services (e.g., applications).

In one or more embodiments, the access commands 142 are configured to establish one or more communication sessions between two or more network components 114 in the core network 112. The access commands 142 may be configured to establish one or more communication sessions between one or more network components 114 in the core network 112 and one of the user equipment 116. Each configuration command of the access commands 142 may establish a communication session between a first network component of the network components 114 comprising the server 102 and a second network component of the network components 114 based at least in part upon a first configuration command of the access commands 142. The access commands 142 may be routing and configuration information for reinstating or reestablishing communication sessions when a change is detected in the operations of the core network 112. For example, in response to losing a specific communication session established with the first access command, the server 102 may attempt to reinstate the specific communication session based at least in part upon a second access command. The access commands 142 may be dynamically or periodically updated from another of the network components 114 in the core network 112. Herein, communication sessions refer to communication signals exchanged between the server 102 and additional network components 114 in the core network 112. In some embodiments, the access commands 142 are provided to the server 102 from another of the network components 114 performing a specific NF. The access commands 142 may be configured to enable access of the one or more services 106. The access commands 142 may be configured to enable access of one or more namespaces (not shown) and/or one or more slice groups (not shown) in a given containerized cluster.

The directories 134 may be configured to store service-specific information, tenant-specific information, and/or user-specific information. The directories 134 may enable the server 102 to confirm tenant credentials to access one or more network components (e.g., one of the network components 114 configured to perform the NRF 108a, an authentication server function (AUSF) 108b, an access and management function (AMF) 108c, one or more cloud network functions (CNFs) 108d, a policy control function (PCF) 108e, a unified data repository (UDR) 108f, a session management function (SMF) 108g, one or more Service Communication Proxys (SCPs) 108h, a Network Slice Selection Assistance Information (NSSAI) 108i, a Network Slice Selection Function (NSSF) 108j, a Network Data Analytics Function (NWDAF) 108k, a Network Slice Admission Control Function (NSACF) 1081, or the like) in the core network 112. The directories 134 may be configured to store the tenant profiles 136 and a reference to the one or more services 106. The directories 134 may be configured to store provider-specific information and service-specific information. The provider-specific information may enable the server 102 to validate credentials associated with a specific provider (e.g., one of the NFs 108) against corresponding user-specific information and service-specific information.

The requests 132 may be a communication or a message configured to indicate a request for access of an application (via an API) or a service 106. The requests 132 may be communications and/or messages requesting access to specific network resources in a network slice in accordance with a corresponding priority level 160. Further, the entitlements 156 may be configured to provide one or more connectivity allowances (e.g., access) between the server 102, the user equipment 116, the base stations 168, and one or more of the network components 114. The entitlements 156 may be assigned to specific departments or tenants. The entitlements 156 may be predefined or dynamically defined in accordance with the rules and policies 140. In the example of FIG. 1, while the entitlement 156a and the entitlements 156b are shown as part of the entitlements 156, the entitlements 156 may comprise less or more additional entitlements 156. The one or more reports 158 may be a communication or a message configured to indicate information to one or more of the network components 114, the base stations 168, and/or the user equipment 116.

The slice priority information 104 may be used for API authentication, service authorization, policies, and one or more system level agreements 154. The slice priority information 104 may enable the server 102 to authenticate a given API to specific tenants and one or groups or departments associated with the tenants. The service authorization, the policies, and the system level agreements 154 may be mapped to the tenant IDs 146, the department ID 148, the organization priority IDs 150, and the slice priority IDs 152. The slice priority information 104 may enable onboarding processes that make mapping of APIs to tenants, and/or departments on the northbound side of a Common API Framework (CAPIF) and Network Exposure Function (NEF) configured to isolate external access to network slices in the core network 112. On the Southbound side of the NEF, the slice priority information 104 may be configured to map a set of slices to a tenant and/or a department through a slice differentiator (SD) field or information element of a Single Network Slice Selection Assistance Information (S-NSSAI). The SD field may comprise the slice priority information 104 to indicate one or more specific tenant IDs 146, one or more specific department IDs 148, one or more organization priority IDs 150, and one or more slice priority IDs 152. In some embodiments, the slice priority information 104 is an information element that comprises an availability between 50 characters and 150 characters.

In one or more embodiments, the tenant IDs 146 may reference one or more characters indicating a tenant associated with one of the tenant profiles 136. In some embodiments, each tenant profile of the tenant profiles 136 may be associated with one or more entitlements 156 for at least one service 106. The department IDs 148 may be configured to reference one or more groups, sub-groups, or portions of a tenant or an organization associated with the tenant. The department IDs 148 may be configured to indicate (e.g., direct to and/or represent) department information comprising one or more departments associated with one or more tenant profiles 136 configured to access one or more of the entitlements 156. The organization priority IDs 150 may be priority information configured to reference a hierarchical assignment for one or more of the departments associated with a given tenant profile 136 to access network slices in the core network 112. For example, the organization priority IDs 150 may be different for two different departments associated with a same tenant. In this regard, a first organization priority ID 150 may indicate first priority information that is greater than, less than, or equal to a second organization priority ID 150 indicating second priority information. In a case that the first organization priority ID 150 is greater than the second organization priority ID 150, enabling access to entitlements 156 associated with the first department would be prioritized over enabling access to entitlements 156 associated with the second department. In a case that the first organization priority ID 150 is less than the second organization priority ID 150, enabling access to entitlements 156 associated with the second department would be prioritized over enabling access to entitlements 156 associated with the first department. In a case that the first organization priority ID 150 is equal to the second organization priority ID 150, enabling access to entitlements 156 associated with the first department may or may not be prioritized over enabling access to entitlements 156 associated with the second department. In this case, the communication system 100 may be configured to prioritize enabling access to entitlements 156 of the first department or the second department in accordance with a time that the corresponding slice priority information is received. The slice priority IDs 152 may be priority information configured to reference a hierarchical assignment for one or more of the tenants and/or one or more of the departments associated with a given tenant profile 136 to access network slices in the core network 112. For example, the slice priority IDs 152 may be different or equal for two different departments associated with a same tenant. In this regard, a first slice priority ID 152 may indicate first priority information that is greater than, less than, or equal to a second slice priority ID 152 indicating second priority information. Similar to the organization priority IDs 150, one of the slice priority IDs 152 may be prioritized over the other based on a comparison of their respective priority information.

In one or more embodiments, the one or more organization priority IDs 150 and/or the slice priority IDs 152 are configured to represent one or more priority levels 160. The priority levels 160 may be a representative priority information extracted from the slice priority information 104. In some embodiments, the priority levels 160 are based on the slice priority IDs 152 when slice priority information 104 do not comprise organization priority IDs 150. The priority levels 160 may indicate a strict priority in a communication network associated with a corresponding slice priority information 104. The strict priority indicates that the priority level 160 is maintained in the entire communication system 100 for one or more specific operations. The priority levels 160 may indicate a weighted priority in a communication network associated with a corresponding slice priority information 104. The weighted priority indicates that the priority level 160 is maintained in at least one portion of the communication system 100 for one or more specific operations. As described above, the requests 132 may be configured to indicate an operation type configured to provide a type of a corresponding entitlement 156. The operation type may be indicated by a Slice/Server Type (SST) information element comprised in the requests 132. The slice priority information 104 may be indicated by an SD information element comprised in the first request.

The slice priority information 104 may be configured to reference a specific API associated with any given departments of a given tenant. The access control list 138 (also referred to as ACL 138) may comprise rules that may allow or deny access to one or more of the entitlements 156 (e.g., a virtual environment). The rules and policies 140 may be security configuration commands or regulatory operations predefined by an organization or one or more users 129. In one or more embodiments, the rules and policies 140 may be dynamically defined by the one or more users 129. The one or more rules and policies 140 may be one or more policies as defined in the 3GPP standards. The system level agreements 154 may be configured to define one or more levels of services 106 expected by a tenant, laying out the metrics by which that services 106 are measured, and the remedies or penalties, if any, should the agreed-on service levels not be achieved. The containerized cluster commands may be configuration information and/or commands to control or modify containerized clusters in the cores of the core network 112.

In one or more embodiments, the NSSAI may comprise one or more S-NSSAIs. For example, the NSSAI may comprise between eight and twelve S-NSSAIs. As described above, each NSSAI may be configured to identify a network slice. In some embodiments, the slice priority information 104 may comprise the S-NSSAI. The S-NSSAI may comprise an SST information element and an SD information element. The SST information element may be configured to reference operation types (e.g., features and services) for a given network slice. The SD information element may be configured to indicate and/or reference one or more tenant profiles 136 and a corresponding priority level 160. The priority level 160 may be indicated in the SD information element by the least significant bit (LSB).

User Equipment

In one or more embodiments, each of the user equipment 116 may be any computing device configured to communicate with other devices, such as the server 102, other network components 114 in the core network 112, databases, and the like in the communication system 100. Each of the user equipment 116 may be configured to perform specific functions described herein and interact with one or more network components 114 in the core network 112 via one or more base stations 168a-168g (collectively, base stations 168). Examples of user equipment 116 comprise, but are not limited to, a laptop, a computer, a smartphone, a tablet, a smart device, an IoT device, a simulated reality device, an augmented reality device, or any other suitable type of device.

In one or more embodiments, referring to the user equipment 116A as a non-limiting example of the user equipment 116, the user equipment 116A may comprise a user equipment (UE) network interface 170, a UE I/O interface 172, a UE processor 174 executing operations via a UE processing engine 176, and a UE memory 178 comprising one or more instructions 180 configured to be executed by the UE processor 174. The UE network interface 170 may be any suitable hardware or software (e.g., executed by hardware) to facilitate any suitable type of communication in wireless or wired connections. These connections may comprise, but not be limited to, all or a portion of network connections coupled to additional network components 114 in the core network 112, the RAN 118, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 170 may be configured to support any suitable type of communication protocol.

The UE I/O interface 172 may be hardware configured to perform one or more communication operations. The UE I/O interface 172 may comprise one or more antennas as part of a transceiver, a receiver, or a transmitter for communicating using one or more wireless communication protocols or technologies. In some embodiments, the UE I/O interface 172 may be configured to communicate using, for example, 5G NR or LTE using at least some shared radio components. In other embodiments, the UE I/O interface 172 may be configured to communicate using single or shared RF bands. The RF bands may be coupled to a single antenna, or may be coupled to multiple antennas (e.g., for a MIMO configuration) to perform wireless communications. In some embodiments, the user equipment 116A may comprise capabilities for voice communication, mobile broadband services (e.g., video streaming, navigation, and the like), or other types of applications. In this regard, the UE I/O interface 172 of the user equipment 116A may communicate using machine-to-machine (M2M) communication, such as machine-type communication (MTC), or another type of M2M communication.

In some embodiments, the user equipment 116A is communicatively coupled to one or more of the base stations 168 via one or more communication links 190a-190g (e.g., collectively, communication links 190). The user equipment 116A may be a device with cellular communication capability such as a mobile phone, a hand-held device, a computer, a laptop, a tablet, a smart watch, or other wearable device, or virtually any type of wireless device. In some applications, the user equipment 116 may be referred to as a UE, UE device, or terminal.

The UE processor 174 may comprise one or more processors operably coupled to and in signal communication with the UE network interface 170, the UE I/O interface 172, and the UE memory 178. The UE processor 174 is any electronic circuitry, including, but not limited to, state machines, one or more CPU chips, logic units, cores (e.g., a multi-core processor), FPGAs, ASICs, or DSPs. The UE processor 174 may be a programmable logic device, a microcontroller, a microprocessor, or any suitable combination of the preceding. The one or more processors in the UE processor 174 are configured to process data and may be implemented in hardware or software executed by hardware. For example, the UE processor 174 may be an 8-bit, a 16-bit, a 32-bit, a 64-bit, or any other suitable architecture. The UE processor 174 comprises an ALU to perform arithmetic and logic operations, processor registers that supply operands to the ALU, and store the results of ALU operations, and a control unit that fetches software instructions such as UE instructions 180 from the UE memory 178 and executes the UE instructions 180 by directing the coordinated operations of the ALU, registers, and other components via a UE processing engine 176. The UE processor 174 may be configured to execute various instructions. For example, the UE processor 174 may be configured to execute the UE instructions 180 to implement functions or perform operations disclosed herein, such as some or all of those described with respect to FIGS. 1-3. In some embodiments, the functions described herein are implemented using logic units, FPGAS, ASICs, DSPs, or any other suitable hardware or electronic circuitry.

Radio Access Network

In one or more embodiments, the RAN 118 enables the user equipment 116 to access one or more services in the core network 112. The one or more services may be a mobile telephone service, a Short Message Service (SMS) message service, a Multimedia Message Service (MMS) message service, an Internet access, cloud computing, or other types of data services. The RAN 118 may comprise the base stations 168 in signal communication with the user equipment 116 via the one or more communication links 190. Each of the base stations 168 may service the user equipment 116a-116g. In some embodiments, while multiple base stations 168 are shown connected to multiple user equipment 116 via the communication links 190, one or more additional base stations 168 may be connected to one or more additional user equipment 116 via one or more additional communication links 190. For example, the base stations 168a-168g may exchange connectivity signals with the user equipment 116a via the communication link 190a. In another example, the base station 168g may exchange connectivity signals with the user equipment 116g via the communication link 190g. In yet another example, the base stations 168 may service some user equipment 116 located within a geographic area serviced by one of the base stations 168.

In one or more embodiments, referring to the base station 168a as a non-limiting example of the base stations 168, the base station 168a may comprise a base station (BS) network interface 182, a BS I/O interface 184, a BS processor 186, and a BS memory 188. The BS network interface 182 may be any suitable hardware or software (e.g., executed by hardware) to facilitate any suitable type of communication in wireless or wired connections between the core network 112 and the user equipment 116. These connections may comprise, but not be limited to, all or a portion of network connections coupled to additional network components 114 in the core network 112, other base stations 168, the user equipment 116, the Internet, an Intranet, a private network, a public network, a peer-to-peer network, the public switched telephone network, a cellular network, a LAN, a MAN, a WAN, and a satellite network. The BS network interface 182 may be configured to support any suitable type of communication protocol.

The BS I/O interface 184 may be hardware configured to perform one or more communication operations. The BS I/O interface 184 may comprise one or more antennas as part of a transceiver, a receiver, or a transmitter for communicating using one or more wireless communication protocols or technologies. In some embodiments, the BS I/O interface 184 may be configured to communicate using, for example, 5G NR or LTE using at least some shared radio components. In other embodiments, the BS I/O interface 184 may be configured to communicate using single or shared RF bands. The RF bands may be coupled to a single antenna, or may be coupled to multiple antennas (e.g., for a MIMO configuration) to perform wireless communications. In some embodiments, the base station 168a may allocate resources in accordance with one or more routing and configuration operations obtained from the core network 112. In some embodiments, resources may be allocated to enable capabilities in the user equipment 116 for voice communication, mobile broadband services (e.g., video streaming, navigation, and the like), or other types of applications.

In some embodiments, the base station 168a is communicatively coupled to one or more of the user equipment 116 via the one or more communication links 190. In some applications, the base stations 168 may be referred to as a BS, evolved Node B (eNodeB or eNB), a next generation Node B, gNodeB, gNB, or terminal.

The BS processor 186 may comprise one or more processors operably coupled to and in signal communication with the BS network interface 182, the BS I/O interface 184, and the BS memory 188. The BS processor 186 is any electronic circuitry, including, but not limited to, state machines, one or more CPU chips, logic units, cores (e.g., a multi-core processor), FPGAs, ASICs, or DSPs. The BS processor 186 may be a programmable logic device, a microcontroller, a microprocessor, or any suitable combination of the preceding. The one or more processors in the BS processor 186 are configured to process data and may be implemented in hardware or software executed by hardware. For example, the BS processor 186 may be an 8-bit, a 16-bit, a 32-bit, a 64-bit, or any other suitable architecture. The BS processor 186 comprises an ALU to perform arithmetic and logic operations, processor registers that supply operands to the ALU, and store the results of ALU operations, and a control unit that fetches software instructions (not shown) from the BS memory 188 and executes the software instructions by directing the coordinated operations of the ALU, registers, and other components via a processing engine (not shown) in the BS processor 186. The BS processor 186 may be configured to execute various instructions. For example, the BS processor 186 may be configured to execute the software instructions to implement functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

Core Network

The core network 112 may be a network configured to manage communication sessions for the user equipment 116. In one or more embodiments, the core network 112 may establish connections between user equipment 116 and a particular data network 110 in accordance with one or more communication protocols. The core network 112 may be a multi-core network 112 configured to comprise multiple cores. In this regard, the multi-core network may comprise multiple NFs 108 in each core. In the example of FIG. 1, the core network 112 comprises the network component 114a configured to perform the NRF 108a, the network component 114b configured to perform the AUSF 108b, the network component 114c configured to perform the AMF 108c, the network component 114d configured to perform the CNFs 108d, the network component 114e configured to perform the PCF 108e, the UDR 108f, the SMF 108g, and the SPCs 108h, and the network component 114f configured to perform the NSSAI 108i, the NSSF 108j, the NWDAF 108k, and the NSACF 1081. Herein, as a non-limiting example, while the NRF 108a is associated with the network component 114a, the core network 112 may comprise multiple network component 114 performing the NRF 108a. For example, a Unified Data Management (UDM) may be part of a core.

In some embodiments, the NRF 108a may comprise a service registration procedure that accesses the one or more databases to store or retrieve routing and configuration information associated with one or more network components 114 in the core network 112. The NRF 108a may access the database to discover services offered by other networks or other network components 114 with service discovery procedures and service authorization procedures. The NRF 108a may maintain a list of available NFs operations available in the core network 112 and any network components 114 associated with performing a given NF 108. The NRF 108a may also performs registration and discovery of service such that different NFs 108 may find each other via APIs. As an example, when the SMF 108g is registered to the NRF 108a, the SMF 108g is discoverable by the AMF 108c when the user equipment 116 attempts to access a given service type via the SMF 108g. In other embodiments, the NFs 108 may be connected via a communication bus to all other additional network elements in the core network 112. In the SBA, the NRF 108a may enable access between the user equipment 116 and the services offered via the NFs 108.

In one or more embodiments, the network components 114d performing the one or more CNFs 108d may be configured to operate multiple services associated with one or more services 106, while dynamically directing network traffic within the core network 112. The network components 114d performing the SMF 108g may be configured to manage one or more communication sessions established between network components 114 of the core network 112, allocate and manage resource allocation routing for the user equipment 116, user plane selection, QoS and configuration enforcements for the control plane, service registration, discovery, establishment, and the like. In other embodiments, the network component 114c performing the AMF 108c may be configured to manage mobility, registration, connections, and overall access for the other network components 114 in the core network 112. The AMF 108c may act as an entry point for connections between the user equipment 116 and a given service. In yet other embodiments, the network component 114e performing the one or more SCPs 108h may be configured to provide a point of entry for a cluster of NFs 108 in the core network 112 to the user equipment 116 once the user equipment 116 are discovered by the NRF 108a. This allows the SCPs 108h to be delegated discovery points in the core network 112. The network component 114b performing the AUSF 108b may be configured to share performing of some of the aforementioned operations with a Unified Data Management (UDM) (not shown). In this regard, the AUSF 108b may be configured to perform authentication processes while the UDM manages user data for any other processes in the core network 112. In other embodiments, the UDM may receive requests for subscriber data from the SMF 108g, the AMF 108c, and the AUSF 108b before providing any services 106. The AUSF 108b may be implemented in one of the network components 114 configured to enable the AMF 108c to authenticate the user equipment 116. The network component 114e performing the PCF 108e may be configured to provide a policy control framework in which the rules and policies 140 are implemented in accordance with one or more application guidelines. In some embodiments, the PCF 108e may apply policy decisions to services provided, accessing subscription information, and the like to control behavior associated with the core network 112. The network component 114e performing the UDR 108f configured to operate as a centralized data repository for subscription data, subscriber policy data, session information, context information, and application states. In some embodiments, the UDR 108f may be configured to provide API integrations with other NFs 108 to retrieve subscriber subscription and policy data. The UDR 108f may notify other NFs 108 of changes in subscriber data, supports real-time or batch (e.g., bulk) data access provisioning and subscriber data provisioning, and manages service parameters and application data for advanced applications.

In one or more embodiments, the network component 114f performing the one or more NSSAI 108i may be configured to uniquely identify a network slice. The S-NS-SAI may contain the SST and the SD. The network component 114f performing the one or more NSSF 108j may be configured to be used by the AMF to assist with the selection of the network slice instances that may serve a particular user equipment 116. In this regard, the NSSF 108j may be configured to determine allowed NSSAI 108i that are supplied to user equipment 116. The network component 114f performing the one or more NWDAF 108k may be configured to streamline processes that regulate how core network data is produced and consumed, as well as to generate insights and take actions to enhance end-user experience. The network component 114f performing the one or more NSACF 108l may be configured to monitor and control the number of registered user equipment 116 and established Protocol Data Unit (PDU) sessions per network slice and feed the information to an Application Function (AF) for analysis and further processing.

In some embodiments, the core network 112 enables the user equipment 116 to communicate with the server 102, or another type of device, located in a particular data network 110 or in signal communication with a particular data network 110. The core network 112 may implement a communication method that does not require the establishment of a specific communication protocol connection between the user equipment 116 and one or more of the data networks 110. The core network 112 may include one or more types of network devices (not shown), which may perform different NFs 108.

In some embodiments, the core network 112 may include a 5G NR or an LTE access network (e.g., an evolved packet core (EPC) network) among others. In this regard, the core network 112 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular Quality of Service (QOS) class, type of service, or particular user associated with one or more of the user equipment 116. For example, a logical network may be a Mobile Private Network (MPN) configured for a particular organization. In this example, when the user equipment 116a is configured and activated by a wireless network associated with the RAN 118, the user equipment 116a may be configured to connect to one or more particular network slices (i.e., logical networks) in the core network 112. Any logical networks or slices that may be configured for the user equipment 116a may be configured using one of the network components 114 of FIG. 1 performing the NSSF that may store a subscription profile associated with the user equipment 116a, in a network component operating as a Unified Data Management (UDM). Further, when the user equipment 116a may request a connection to a particular logical network or slice, the user equipment 116a may send a request to the network component performing the AMF 108c. The AMF 108c may provide a list of allowed logical networks or slices to the user equipment 116a. The user equipment 116a may then request a PDU connection with one or more of the provided logical networks or slices.

In one or more embodiments, the server 102 is configured to perform multiple network slicing operations. In this regard, the network slicing operations may be configured to run multiple logical networks as virtually independent organization operations on a common physical infrastructure. The organization operations may comprise service instance layer operations, network slice instance layer operations, and resources layer operations.

Data Networks

In the example system 100 of FIG. 1, the data networks 110 may facilitate communication within the communication system 100. This disclosure contemplates that the data networks 110 may be any suitable network operable to facilitate communication between the server 102, the core network 112, the RAN 118, and the user equipment 116. The data networks 110 may include any interconnecting system capable of transmitting audio, video, signals, data, messages, or any combination of the preceding. The data networks 110 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

Slice Priority Information Structures

FIG. 2 illustrate example structures associated with the slice priority information in accordance with one or more embodiments. In the example of FIG. 2, a slice priority information structure 200 is shown comprising a number of characters divided into two information elements. As non-limiting examples, FIG. 2 shows that these information elements may comprise a Slice/Service Type (SST) 202 and a slice differentiator (SD) 212. In some embodiments, the SST 202 may comprise an operation type ID 222 configured to indicate a type of an operation to be performed using the slice priority information 104. In other embodiments, the SD 212 may comprise a number of K characters corresponding to a tenant ID 146, a number of L characters corresponding to a department ID 148, a number of M characters corresponding to an organization priority ID 150, and a number of N characters corresponding to a slice priority ID 152. The length of each field may be variable by using any character or symbol (e.g., dash symbol, dot character, space, underscore character or the like) between the fields (e.g., TENANT1-DEPARTMENT6-API7"). In some embodiments, the length of each field may be modified by using abbreviation, short phrases, or nicknames for the tenant IDs 146, the department IDs 148, the organization priority IDs 150, and/or the slice priority IDs 152 (e.g., "TEN1.DEPT1.API1" using nickname "TENT1" for a specific tenant ID 146 and abbreviation "DEPT1" for a specific department ID 148.

In FIG. 2, as a non-limiting representative example, the number of slice priority information characters in the slice priority information structure 200 may comprise 24 bits, the number of K characters may be 8 bits, the number of L characters may be 8 bits, the number of M characters may be 4 bits, and the number of N characters may be 4 bits. The number of K characters, the number of L characters, the number of M characters, and the number of N characters may be modified such that they comprise different values that, when added together, remain within a total of 24 bits available in the slice priority information characters.

In some embodiments, the organization priority ID 150 and the slice priority ID 152 are two priority fields that form the priority level 160. In cases where the slice priority information 104 does not comprise the organization priority ID 150, the slice priority ID 152 may be configured as the only priority field that forms the priority level 160. Each one of these priority levels 160 may be either strict priority or weighted priority.

In some embodiments, the number of slice priority information characters may be modified in accordance with the rules and policies 140. For example, the number of slice priority information characters may be variable to be between 64 bits and 4 bits, inclusive. The number of slice priority information characters may be a number of available characters. Herein, while the length of the SD 212 may be 24 bits, information comprising multiple additional characters may be mapped to the SD 212 (e.g., 2 to the power of 48). In this regard, the slice priority information 104 may comprise more or less characters than those available when referencing a specific network slice. For example, the slice priority information 104 comprising a total of 24 bits in the SD 212 may map and/or reference "TENANT6.DEPARTMENT2.ORGPRI1.SLICEPRI1" to access an organization priority as "ORGPRI1" and a slice priority as "SLICEPRI1" to be operated in accordance with entitlements 156 granted to a department named "DEPARTMENT2" of a tenant named "TENANT6." In this example, while the number of bits in the slice priority information 104 "TENANT6.DEPARTMENT2.ORGPRI1.SLICEPRI1" may be equal to 24 bits, the number of slice priority information characters mapped may be greater than 24 bits. Further, the number of characters mapped by tenant IDs 146, the department IDs 148, the organization priority IDs 150, and the slice priority IDs 152 in a given slice priority information 104 may be different or equal to one another. For example, a number of slice priority information characters mapped to bits in the SD 212 may be 120 characters with 30 characters corresponding to each of the tenant IDs 146, the department IDs 148, the organization priority IDs 150, and the slice priority IDs 152. In another example, a number of slice priority information characters mapped to bits in the SD 212 may be 180 characters with 50 characters corresponding to the tenant IDs 146, 100 characters corresponding to the department IDs 148, 10 characters corresponding to the organization priority IDs 150, and 20 characters corresponding to the slice priority IDs 152.

As a non-limiting example, the slice priority information 104 may comprise 32 bits, where 8 bits are assigned to the SST information element and 24 bits are assigned to the SD information element. In one or more embodiments, the slice priority information 104 may indicate and/or represent the tenant IDs 146, the department IDs 148, the organization priority IDs 150, and the slice priority IDs 152 using one or more representative bits. These representative bits may be looked up in a reference table to match each of the IDs with corresponding characters describing tenant information and/or department information. For example, the slice priority information 104 may be configured to comprise a range between 2 bits and 64 bits, inclusive. In this regard, the SST information element may comprise between 2 bits and 64 bits, inclusive. Further, the SD information element may comprise between 2 and 64 bits, inclusive.

As described above, the slice priority information 104 may comprise the SST information element and the SD information element. The size (in bits) of the SST information element and the SD information element in the slice priority information 104 (e.g., representative name for the S-NSSAI) may be configured in accordance with Technical Specifications 23.003 and 23.502 of the 3GPP standards. In one or more embodiments, when the slice priority information 104 is configured as an S-NSSAI, the SST information element may comprise an 8-bit field length that may indicate a total of 255 different network slice types. The field for the SST information element may comprise standardized and non-standardized values. In some embodiments, the SST value may be equal to 1 to indicate that one or more network slices referenced in the SD information element are suitable for the handling of 5G enhanced Mobile Broadband (eMBB), the SST value may be equal to 2 to indicate that one or more network slices referenced in the SD information element are suitable for the handling of ultra-reliable low latency communications (URLLC), the SST value may be equal to 3 to indicate that one or more network slices referenced in the SD information element are suitable for the handling of massive Internet-of-Things (IoT) (MIoT) operations, the SST value may be equal to 4 to indicate that one or more network slices referenced in the SD information element are suitable for the handling of vehicle-to-everything (V2X) services, and the SST value may be equal to 5 to indicate that one or more network slices referenced in the SD information element are suitable for the handling of high-performance machine-type communications (HMTC). Example Process to Enable Slice Priority for Multi-Tenant Architecture FIG. 3 illustrates an example flowchart of a process 300 to enable slice priority for multi-tenant architecture, in accordance with one or more embodiments. In one or more embodiments, the process 300 comprises operations 302-322. Modifications, additions, or omissions may be made to the process 300. The process 300 may include more, fewer, or other operations than those shown below. For example, operations may be performed in parallel or in any suitable order. While at times discussed as the server 102, one or more of the user equipment 116, components of any of thereof, or any suitable system or components of the communication system 100 may perform one or more operations of the process 300. For example, one or more operations of the process 300 may be implemented, at least in part, in the form of server instructions 130 of FIG. 1, stored on non-transitory computer readable media, tangible media, machine-readable media (e.g., server memory 128 of FIG. 1 operating as a non-transitory computer readable medium) that when run by one or more processors (e.g., the server processor 120 of FIG. 1) may cause the one or more processors to perform operations described in operations 302-322 of the process 300.

FIG. 3 illustrates an example flowchart of the process 300 to enable slice priority for multi-tenant architecture, in accordance with one or more embodiments. In one or more embodiments, the process 300 starts at operation 302, where the server 102 is configured to receive a request 132 to access at least one of the one or more entitlements 156 for a service 106. In one or more embodiments, one of the user equipment 116 (e.g., user equipment 116a) may initiate registration with the 5G network by sending a registration request message to the core network 112. The request 132 may indicate slice priority information 104 comprising a priority level 160 representative of (e.g., indicating) an importance of a communication associated with the request 132. At operation 304, the server 102 is configured to determine the slice priority information 104 in the incoming request 132. At operation 306, the server 102 is configured to obtain a tenant ID 146 and a slice priority ID 152 from the slice priority information 104. The tenant ID 146 may indicate a tenant profile 136 configured to access an entitlement 156a via the service 106 and the slice priority ID 152 indicating the priority level 160. In some embodiments, the server 102 may be configured to obtain the tenant ID 146, the department ID 148, an organization priority ID 150, and the slice priority ID 152. The tenant ID 146 and the department ID 148 may indicate the tenant profile 136 configured to access an entitlement 156b via the service 106 and the organization priority ID 150 and the slice priority ID 152 indicating the priority level 160. The request 132 may be a registration request message that comprises a list of requested NSSAIs that the user equipment 116a attempts to use for a current registration. In this regard, the core network 112 may receive the registration request message and check the requested NSSAIs against the allowed NSSAIs configured for 5G network slices. If the requested NSSAIs are allowed by the network, the core network 112 selects a network slice based on the configured NSSAIs and sends a registration accept message to the user equipment 116. Herein, one or more of the operations described in reference to the core network 112 may be performed by the server 102.

The process 300 continues at operation 310, where the server 102 may identify whether the multiple identifiers match information in the directories 134. If the server 102 determines that the multiple identifiers do not match information in the directories 134 (i.e., NO), the process 300 proceeds to operation 312. At operation 312, the server 102 is configured to indicate that one or more of the identifiers do not match the information in the directories 134. If the server 102 determines that the multiple identifiers match information in the directories 134 (i.e., YES), the process 300 proceeds to operation 322.

The process 300 may conclude at operation 322 and operation 324, where the registration accept message may comprise the allowed NSSAI and other information that informs the user equipment 116a to access the network slice. At operation 322, the server 102 is configured to determine one or more network access commands 142 based at least in part upon the tenant profile 136. The network access commands 142 may be configured to enable access to the entitlement 156a via the service 106. At operation 324, the server 102 is configured to generate a report 158 comprising the network access commands 142. The user equipment 116a may receive the registration accept message. The core network 112 may monitor the configured NSSAI for each network slice in the server memory 128.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus, comprising:
a memory operable to store:
a plurality of tenant profiles, each tenant profile of the plurality of tenant profiles being associated with one or more entitlements for at least one service; and
a processor communicatively coupled to the memory and configured to:
receive a first request to access at least one of the one or more entitlements for a first service, the first request indicating first slice priority information comprising a first priority level indicating a first importance of a first communication associated with the first request;
obtain a first tenant identifier (ID) and a first slice priority ID from the first slice priority information, the first tenant ID indicating a first tenant profile configured to access a first entitlement via the first service and the first slice priority ID indicating the first priority level;
determine a first plurality of network access commands based at least in part upon the first tenant profile, the first plurality of network access commands being configured to enable access to the first entitlement via the first service; and
generate a first report comprising the first plurality of network access commands.

2. The apparatus of claim 1, wherein the processor is further configured to:
receive a second request to access at least one of the one or more entitlements for a second service, the second request indicating second slice priority information comprising a second priority level indicating a second importance of a second communication associated with the second request;
obtain a second tenant ID, a department ID, and a second slice priority ID from the second slice priority information, wherein:
the second tenant ID indicates a second tenant profile configured to access a second entitlement via the second service;
the department ID indicates department information comprising a department associated with the second tenant profile configured to access the second entitlement; and
the second slice priority ID indicates the second priority level;
determine a second plurality of network access commands based at least in part upon the second tenant profile and the department information, the second plurality of network access commands being configured to enable access to the second entitlement via the second service; and
generate a second report comprising the second plurality of network access commands.

3. The apparatus of claim 1, wherein the processor is further configured to:
receive a second request to access at least one of the one or more entitlements for a second service, the second request indicating second slice priority information comprising a second priority level indicating a second importance of a second communication associated with the second request;

obtain a second tenant ID, a first department ID, a first organization priority ID, and a second slice priority ID from the second slice priority information, wherein:
the second tenant ID indicates a second tenant profile configured to access a second entitlement via the second service;
the first department ID indicates first department information comprising a first department associated with the second tenant profile configured to access the second entitlement; and
the first organization information and the second slice priority ID indicate the second priority level;
determine a second plurality of network access commands based at least in part upon the second tenant profile and the department information, the second plurality of network access commands being configured to enable access to the second entitlement via the second service;
receive a third request to access at least one of the one or more entitlements for a second service, the third request indicating third slice priority information comprising a third priority level indicating a third importance of a third communication associated with the third request;
obtain the second tenant ID, a second department ID, a second organization priority ID, and a third slice priority ID from the third slice priority information, wherein:
the second department ID indicates second department information comprising a second department associated with the second tenant profile configured to access the third entitlement;
the second organization information and the third slice priority ID indicate the third priority level; and
the second priority level being greater than the third priority level;
determine a third plurality of network access commands based at least in part upon the second tenant profile and the second department information, the third plurality of network access commands being configured to enable access to the third entitlement via the second service;
generate a second report comprising the second plurality of network access commands; and
generate a third report comprising the third plurality of network access commands.

4. The apparatus of claim 1, wherein the processor is further configured to:
receive a second request to access at least one of the one or more entitlements for a second service, the second request indicating second slice priority information comprising a second priority level indicating a second importance of a second communication associated with the second request;
obtain a second tenant ID, a first department ID, a first organization priority ID, and a second slice priority ID from the second slice priority information, wherein:
the second tenant ID indicates a second tenant profile configured to access a second entitlement via the second service;
the first department ID indicates first department information comprising a first department associated with the second tenant profile configured to access the second entitlement; and
the first organization information and the second slice priority ID indicate the second priority level;
determine a second plurality of network access commands based at least in part upon the second tenant profile and the department information, the second plurality of network access commands being configured to enable access to the second entitlement via the second service;

receive a third request to access at least one of the one or more entitlements for a third service, the third request indicating third slice priority information comprising a third priority level indicating a third importance of a third communication associated with the third request;

obtain a third tenant ID and a third slice priority ID from the third slice priority information, wherein:

the third tenant ID indicates a third tenant profile configured to access a third entitlement via the third service;

the third slice priority ID indicates the third priority level; and the second priority level being greater than the third priority level;

determine a third plurality of network access commands based at least in part upon the third tenant profile, the third plurality of network access commands being configured to enable access to the third entitlement via the third service;

generate a second report comprising the second plurality of network access commands; and generate a third report comprising the third plurality of network access commands.

5. The apparatus of claim 1, wherein the first priority level indicates a strict priority in a communication network.

6. The apparatus of claim 1, wherein the first priority level indicates a weighted priority in a communication network.

7. The apparatus of claim 1, wherein the first request further indicates an operation type ID configured to provide a type of the first entitlement.

8. The apparatus of claim 7, wherein:

the operation type ID is indicated by a Slice/Server Type (SST) information element comprised in the first request; and the first slice priority information is indicated by a Slice Differentiator (SD) information element comprised in the first request.

9. A method, comprising:

receiving a first request to access at least one of one or more entitlements for a first service, the first request indicating first slice priority information comprising a first priority level indicating a first importance of a first communication associated with the first request;

obtaining a first tenant identifier (ID) and a first slice priority ID from the first slice priority information, the first tenant ID indicating a first tenant profile configured to access a first entitlement via the first service and the first slice priority ID indicating the first priority level;

determining a first plurality of network access commands based at least in part upon the first tenant profile, the first plurality of network access commands being configured to enable access to the first entitlement via the first service; and generating a first report comprising the first plurality of network access commands.

10. The method of claim 9, further comprising:

receiving a second request to access at least one of the one or more entitlements for a second service, the second request indicating second slice priority information comprising a second priority level indicating a second importance of a second communication associated with the second request;

obtaining a second tenant ID, a department ID, and a second slice priority ID from the second slice priority information, wherein:

the second tenant ID indicates a second tenant profile configured to access a second entitlement via the second service;

the department ID indicates department information comprising a department associated with the second tenant profile configured to access the second entitlement; and the second slice priority ID indicates the second priority level;

determining a second plurality of network access commands based at least in part upon the second tenant profile and the department information, the second plurality of network access commands being configured to enable access to the second entitlement via the second service; and generating a second report comprising the second plurality of network access commands.

11. The method of claim 9, further comprising:

receiving a second request to access at least one of the one or more entitlements for a second service, the second request indicating second slice priority information comprising a second priority level indicating a second importance of a second communication associated with the second request;

obtaining a second tenant ID, a first department ID, a first organization priority ID, and a second slice priority ID from the second slice priority information, wherein:

the second tenant ID indicates a second tenant profile configured to access a second entitlement via the second service;

the first department ID indicates first department information comprising a first department associated with the second tenant profile configured to access the second entitlement; and the first organization information and the second slice priority ID indicate the second priority level;

determining a second plurality of network access commands based at least in part upon the second tenant profile and the department information, the second plurality of network access commands being configured to enable access to the second entitlement via the second service;

receiving a third request to access at least one of the one or more entitlements for a second service, the third request indicating third slice priority information comprising a third priority level indicating a third importance of a third communication associated with the third request;

obtaining the second tenant ID, a second department ID, a second organization priority ID, and a third slice priority ID from the third slice priority information, wherein:

the second department ID indicates second department information comprising a second department associated with the second tenant profile configured to access the third entitlement;

the second organization information and the third slice priority ID indicate the third priority level; and the second priority level being greater than the third priority level;

determining a third plurality of network access commands based at least in part upon the second tenant profile and the second department information, the third plurality of network access commands being configured to enable access to the third entitlement via the second service;

generating a second report comprising the second plurality of network access commands; and generating a third report comprising the third plurality of network access commands.

12. The method of claim 9, further comprising:

receiving a second request to access at least one of the one or more entitlements for a second service, the second request indicating second slice priority information comprising a second priority level indicating a second importance of a second communication associated with the second request;

obtaining a second tenant ID, a first department ID, a first organization priority ID, and a second slice priority ID from the second slice priority information, wherein:

the second tenant ID indicates a second tenant profile configured to access a second entitlement via the second service;

the first department ID indicates first department information comprising a first department associated with the second tenant profile configured to access the second entitlement; and the first organization information and the second slice priority ID indicate the second priority level;

determining a second plurality of network access commands based at least in part upon the second tenant profile and the department information, the second plurality of network access commands being configured to enable access to the second entitlement via the second service;

receiving a third request to access at least one of the one or more entitlements for a third service, the third request indicating third slice priority information comprising a third priority level indicating a third importance of a third communication associated with the third request;

obtaining a third tenant ID and a third slice priority ID from the third slice priority information, wherein:

the third tenant ID indicates a third tenant profile configured to access a third entitlement via the third service;

the third slice priority ID indicates the third priority level; and the second priority level being greater than the third priority level;

determining a third plurality of network access commands based at least in part upon the third tenant profile, the third plurality of network access commands being configured to enable access to the third entitlement via the third service;

generating a second report comprising the second plurality of network access commands; and generating a third report comprising the third plurality of network access commands.

13. The method of claim 9, wherein the first priority level indicates a strict priority in a communication network.

14. The method of claim 9, wherein the first priority level indicates a weighted priority in a communication network.

15. The method of claim 9, wherein the first request further indicates an operation type ID configured to provide a type of the first entitlement.

16. The method of claim 15, wherein:

the operation type ID is indicated by a Slice/Server Type (SST) information element comprised in the first request; and the first slice priority information is indicated by a Slice Differentiator (SD) information element comprised in the first request.

17. A non-transitory computer readable medium storing instructions that when executed by a processor cause the processor to:

receive a first request to access at least one of one or more entitlements for a first service, the first request indicating first slice priority information comprising a first priority level indicating a first importance of a first communication associated with the first request;

obtain a first tenant identifier (ID) and a first slice priority ID from the first slice priority information, the first tenant ID indicating a first tenant profile configured to access a first entitlement via the first service and the first slice priority ID indicating the first priority level;

determine a first plurality of network access commands based at least in part upon the first tenant profile, the first plurality of network access commands being configured to enable access to the first entitlement via the first service; and generate a first report comprising the first plurality of network access commands.

18. The non-transitory computer readable medium of claim 17, wherein the processor is further caused to:

receive a second request to access at least one of the one or more entitlements for a second service, the second request indicating second slice priority information comprising a second priority level indicating a second importance of a second communication associated with the second request;

obtain a second tenant ID, a department ID, and a second slice priority ID from the second slice priority information, wherein:

the second tenant ID indicates a second tenant profile configured to access a second entitlement via the second service;

the department ID indicates department information comprising a department associated with the second tenant profile configured to access the second entitlement; and the second slice priority ID indicates the second priority level;

determine a second plurality of network access commands based at least in part upon the second tenant profile and the department information, the second plurality of network access commands being configured to enable access to the second entitlement via the second service; and generate a second report comprising the second plurality of network access commands.

19. The non-transitory computer readable medium of claim 17, wherein the processor is further caused to:

receive a second request to access at least one of the one or more entitlements for a second service, the second request indicating second slice priority information comprising a second priority level indicating a second importance of a second communication associated with the second request;

obtain a second tenant ID, a first department ID, a first organization priority ID, and a second slice priority ID from the second slice priority information, wherein:

the second tenant ID indicates a second tenant profile configured to access a second entitlement via the second service;

the first department ID indicates first department information comprising a first department associated with the second tenant profile configured to access the second entitlement; and the first organization information and the second slice priority ID indicate the second priority level;

determine a second plurality of network access commands based at least in part upon the second tenant profile and the department information, the second plurality of network access commands being configured to enable access to the second entitlement via the second service;

receive a third request to access at least one of the one or more entitlements for a second service, the third request indicating third slice priority information comprising a third priority level indicating a third importance of a third communication associated with the third request;

obtain the second tenant ID, a second department ID, a second organization priority ID, and a third slice priority ID from the third slice priority information, wherein:

the second department ID indicates second department information comprising a second department associated with the second tenant profile configured to access the third entitlement;

the second organization information and the third slice priority ID indicate the third priority level; and the second priority level being greater than the third priority level;

determine a third plurality of network access commands based at least in part upon the second tenant profile and the second department information, the third plurality of network access commands being configured to enable access to the third entitlement via the second service;

generate a second report comprising the second plurality of network access commands; and generate a third report comprising the third plurality of network access commands.

20. The non-transitory computer readable medium of claim 17, wherein the processor is further caused to:

receive a second request to access at least one of the one or more entitlements for a second service, the second request indicating second slice priority information comprising a second priority level indicating a second importance of a second communication associated with the second request;

obtain a second tenant ID, a first department ID, a first organization priority ID, and a second slice priority ID from the second slice priority information, wherein:

the second tenant ID indicates a second tenant profile configured to access a second entitlement via the second service;

the first department ID indicates first department information comprising a first department associated with the second tenant profile configured to access the second entitlement; and the first organization information and the second slice priority ID indicate the second priority level;

determine a second plurality of network access commands based at least in part upon the second tenant profile and the department information, the second plurality of network access commands being configured to enable access to the second entitlement via the second service;

receive a third request to access at least one of the one or more entitlements for a third service, the third request indicating third slice priority information comprising a third priority level indicating a third importance of a third communication associated with the third request;

obtain a third tenant ID and a third slice priority ID from the third slice priority information, wherein:

the third tenant ID indicates a third tenant profile configured to access a third entitlement via the third service;

the third slice priority ID indicates the third priority level; and the second priority level being greater than the third priority level;

determine a third plurality of network access commands based at least in part upon the third tenant profile, the third plurality of network access commands being configured to enable access to the third entitlement via the third service;

generate a second report comprising the second plurality of network access commands; and generate a third report comprising the third plurality of network access commands.

\* \* \* \* \*